United States Patent Office 3,631,114
Patented Dec. 28, 1971

3,631,114
DITERTIARY BETA-DIOLS
Raymond Valette, Paris, France, assignor to Les Laboratoires Albert Rolland, Paris, France
No Drawing. Continuation-in-part of application Ser. No. 262,849, Mar. 5, 1963. This application Aug. 2, 1968, Ser. No. 749,574
Int. Cl. C07c 31/14
U.S. Cl. 260—618 D
3 Claims

ABSTRACT OF THE DISCLOSURE

A process for the preparation of ditertiary beta-diols of the general Formula I

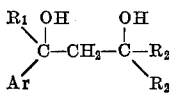

in which $R_1$ and $R_2$ represent identical or different lower alkyl radicals, and Ar represents an aryl radical which may be a phenyl or a para-halogen such as chlorine, bromine or fluorine, substituted phenyl radical, which comprises effecting reaction between a hydroxyester of the formula

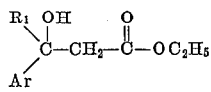

and an organomagnesium compound of the formula $R_2MgX$, in which $R_1$, Ar and $R_2$ have the meaning stated above and X is a halogen atom, in a molar ratio of 1:3, and hydrolysing the product.

New compounds of Formula I in which $R_1$ and $R_2$ have different numbers of carbon atoms.

---

This is a continuation-in-part of application Ser. No. 262,849, filed Mar. 5, 1963, and now abandoned.

The present invention concerns a new process for the preparation of ditertiary beta-diols. It is concerned more particularly with a process for the preparation of 1-aryl-1,3,3-trialkyl-1,3-propanediols of the general formula:

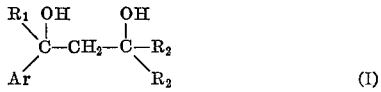 (I)

in which $R_1$ and $R_2$ represent identical or different lower alkyl radicals, and Ar represents an aryl radical which may be a phenyl or a para-halogen such as chlorine, bromine or fluorine, substituted phenyl radical.

When in Formula I the methylene group —$CH_2$— is taken as a center of symmetry, with regard to $R_1$ equal to $R_2$ or $R_1$ being different from $R_2$, the compounds may be called symmetric or asymmetric, respectively, since in the first instance, on each side of the methylene group, the alkyl chain has the same number of carbon atoms, or to the contrary, it has a different number of carbon atoms. Thus, it is possible to ascribe to the symmetric compounds responding to Formula I the following formula:

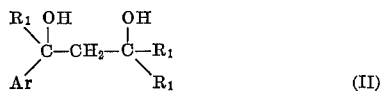 (II)

in which $R_1$ and Ar have the above noted meanings. Whereas to the asymmetric compounds responding to Formula I we may ascribe the following formula:

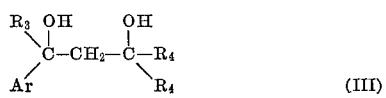 (III)

in which $R_3$ and $R_4$ are different lower alkyl radicals as specified above.

Another object of the present invention concerns more particularly the "asymmetric" compounds of Formula III which are new compounds.

The inventor has disclosed in French Pat. No. 1,248,420 an example of a symmetric compound of Formula II in which $R_1$ is a methyl radical, namely, 2-methyl-4-p-chlorophenyl-pentane-diol.

This known compound has useful central nervous system activity of a tranquilizing character, having both, stimulating and depressive effects, thus possessing in a single molecule, therapeutic properties which are generally obtained only by means of an association such as that of a barbituric and amphetamine.

It was thus interesting to make a study of a series of tertiary beta-diols of Formula I and to verify if the therapeutic activity of the known compound was able to be generalized. For this reason, it was necessary to find a general process to manufacture the compounds of Formula I.

According to the present invention, such a general process has been provided and the general advantageous character for therapy of the compounds of Formula I has been able to be verified. Specifically, the inventor has observed that the new asymmetric tertiary beta-diols of Formula I (compounds of Formula III), according to the present invention have an activity on the central nervous system, but that they differ from the symmetric compounds, one of which was known as mentioned above, by an increase of the barbituric sleep potentialization, and an increase of depressive effects while maintaining the anticonvulsive effects, which provide them with new and significant therapeutic properties.

As indicated above, the inventor has already prepared a symmetric tertiary beta-diol of the Formula I (compound of Formula II) according to the cited French Pat. No. 1,248,420. This process utilized as a starting material a beta-ketol (or beta-hydroxy-ketone) of Formula IX as follows:

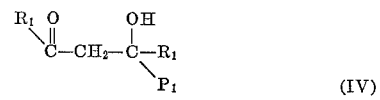 (IV)

in which $R_1$ is a methyl radical, on which was reacted successively two organomagnesium compounds of different nature:

(1) An aliphatic magnesium compound, RMgX, for blocking the OH-group, and chosen such as to give a volatile hydrocarbon during the final hydrolysis step;

(2) An aromatic magnesium compound, ArMgX to provide the aryl radical, by attacking the carbonyl

This known process can only provide the symmetric compounds since the starting material of Formula IV is itself symmetric. Moreover, the known process only allows an approach to symmetric compounds where $R_1$ is a methyl radical since only one of the starting beta-ketols is easily or readily prepared commercially, namely the diacetone-alcohol of the formula

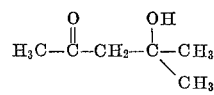

The possibility of access to the products is still limited by the obligation to use an aromatic magnesium compound whose preparation is often difficult and which is often unstable making it frequently useless.

Even when the necessary reagents are available and this is in itself relatively complicated and costly since it is necessary to use two types of magnesium reagents, the known process is often accompanied by side reactions frequently met in Grignard-type reaction. Thus, when working with aliphatic magnesium reagents, there is a risk of partial dehydration of the beta-hydroxy-ketone while certain aromatic magnesium compounds, namely ring substituted are incompatible with a magnesian condensation. Consequently, the yields of the known process are low, or the reaction may not take place.

It is known on the other hand, for example, Morrison et al., "Organic Chemistry," 1959, pages 485, 491 and 492, that it is theoretically advantageous to prepare tertiary alcohols starting from esters in place of ketones, utilizing magnesium reagents. However, until now the beta-hydroxy-esters have never been used in this type of reaction and consequently the synthesis of tertiary beta-diols has not been achieved. In effect as already noted, the character of the Grignard reaction is in no way general and dehydration with molecular transpositions or other undesired side reactions are often encountered, namely, when the starting or resulting materials are molecules activated by several oxygenated carbon atoms.

It was not obvious to use the beta-hydroxy-esters as a starting material in reactions with magnesium derivatives. Specifically, the instability of the tertiary OH-function in the beta-hydroxy-esters, utilized in the present invention, is well known. Also, due to the well-known dehydrating effect of magnesium derivatives more or less dehydrated, mono or diethylenic by-products could be expected instead of the desired ditertiary beta-diols.

As disclosed, below, in order to avoid these side reactions, the inventor studied and determined the particular conditions for the reaction.

According to the present invention, it was found unexpectedly that one can prepare the above mentioned compounds of Formula I by a general, simple, economical and convenient process which avoids the above noted defects, using as starting materials, a beta-hydroxy-ester of formula

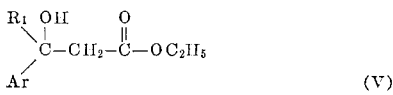

(V)

in which $R_1$ and Ar have the above stated meaning, thus a starting compound whose structure already comprises the aryl radical Ar of the desired final diol, and an aliphatic magnesium compound of formula $R_2MgX$ (VI), in which $R_2$ has the above-stated meaning.

The compounds of Formula I can be prepared according to the invention by a process which comprises reacting a hydroxyester responding to the above Formula V and an organic magnesium compound of Formula VI, in a ratio of three organomagnesium molecules to one molecule of hydroxyester, and then carrying out an hydrolysis of the resulting magnesium compound to obtain the diol.

According to this process the magnesium compound is added to the beta-hydroxy-ester. When this order is inversed, the results are distinctly unsatisfactory, as shown in the experiments described below.

Hydrolysis is carried out in the presence of ammonium chloride. Indeed, the classic acid hydrolysis of Grignard reaction products is not applicable in the process of the invention, because it can lower the yield of desired material by its partial dehydration.

The reaction according to this invention may be represented in the following manner:

In the first step, a molecule of the organo-magnesium compound blocks the alcohol function in the following manner:

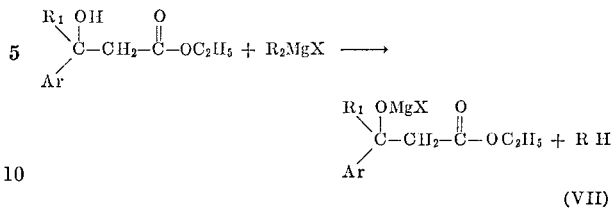

(VII)

The remaining two molecules of the organomagnesium compound react as follows:

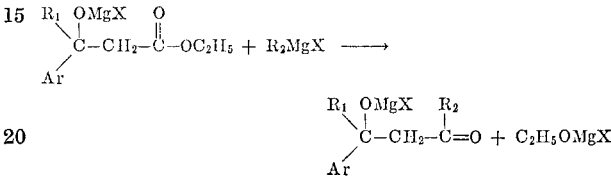

(VIII)

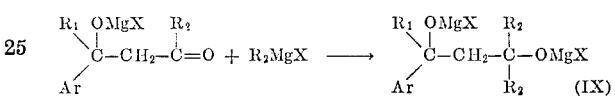

(IX)

The resulting organomagnesium compound is then hydrolysed in a conventional manner by an acidic solution, in order to obtain the desired tertiary beta-diol of Formula I, which can be isolated by crystallisation.

The hydroxyester used as a starting material, was prepared in a conventional manner by the Reformatzky reaction, for example.

Depending on the choice of the aliphatic magnesium compound, by varying the number of carbon atoms of $R_2$ in its formula, the process of this invention provides a means to obtain as well symmetric tertiary beta-diols of Formula II, as asymmetric tertiary beta-diols of Formula III. It enables, generally, to obtain tertiary beta-diols which were not possible to obtain according to the process of the prior art.

Indeed, in the process in accordance with the invention, the aryl radical is already present in the starting material. It is only necessary to vary the magnesium compound in order to obtain different desired materials, using the same starting material. In particular the series of asymmetric compounds of Formula III can be easily reached in this way.

Moreover, the advantages of the process of the present invention consist in the use of a beta-hydroxy-ester and a single aliphatic magnesium compound, both readily available; in the important saving of starting materials and in the high yields obtainable by the reaction involved in this process. It was emphasized above that, when reversing the order of introducing the reagents, the results are quite different, as shown below.

(1) Adding of the hydroxy-ester to the magnesium solution (as in the classic Grignard reaction).

Yield of beta-diol: 52%

Hydrogen absorption of the reaction mixture (on Raney nickel): 3.5 liters of $H_2$ per 100 g.

$H_2$ per 100 g.

(2) Adding of the magnesium compound to the hydroxyester (the process in accordance with the present invention).

Yield of beta-diol: 73%

Hydrogen absorption: 0.9 liter per 100 g.

(Some mixtures resulted in a hydrogen absorption of the order of 0.5 liter per kg.).

This shows that dehydration is largely avoidable, by adding the magnesium compound to the hydroxy-ester.

The examples which are described below, illustrate the process of the invention, without in any way limiting its scope.

In the following Examples 1, 2, 3, symmetric compounds of Formula II are described:

EXAMPLE 1

1-p-chlorophenyl-1,3,3-trimethyl-1,3-propane-diol

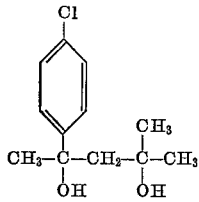

is prepared, using as starting material ethyl beta-(p-chlorophenyl)-beta-hydroxybutyrate of the formula

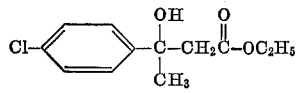

which has been prepared by the Reformatsky reaction, i.e. by condensing ethyl bromoacetate with p-chloroketophenone.

The first stage of the reaction of the invention is carried out in a spherical flask into which 40 g. of magnesium chips have been introduced. A trace of iodine is added and a dry nitrogen atmosphere is maintained.

The product is covered with 300 cc. of anhydrous ether and a few cc. of methyl iodide are added. The reaction is started by gentle heating, and the remainder of the methyl iodide is then introduced, i.e. 50 cc. (0.8 mol.) in 100 cc. of ether. At the end of the reaction, there is obtained a clear solution containing a slight blackish suspension.

The solution is made up to a volume of 500 cc.

The condensation reaction is thereafter carried out in a second spherical flask containing 2/10 mol. of hydroxy ester and 300 cc. of anhydrous ether. The product is cooled and the magnesium solution previously prepared is run into the flask with stirring.

The blocking of the hydroxyl group can be followed by determining the volume of methane liberated. When the evolution of methane ceases, the reaction proper commences. It is less vigorous and the temperature remains constant. The flask is left at ambient temperature for 12 hours and the progress of the reaction is determined by titrating the unreacted organomagnesium compound.

When the reaction is complete, the hydrolysis is carried out by pouring the ethereal solution onto a mixture of 1 kg. of ice and 1 litre of water containing 100 g. of ammonium chloride. The decanted ethereal solution is taken up with a 5% sulphuric acid solution and washed with water containing sodium bicarbonate and again with water, to neutrality and dried over sodium sulphate.

The ether is distilled off and the oily residue is dried in vacuo. Crystallisation starts at once, and is allowed to continue for 24 hours, after which the product is separated and twice treated with petroleum ether. There are thus obtained 34 g. of a product which, on recrystallisation from petroleum ether, takes the form of a microcrystalline powder, M.P. 76.5° C.

It is apparent from the above that the process of the invention is particularly advantageous by reason of the yield which can be obtained (73%), as compared with the yield of 52% given by the previously known process; this represents a yield increase of almost 50%.

EXAMPLE 2

1-phenyl-1,3,3-trimethyl-1,3-propanediol

Acetophenone is condensed with ethyl bromacetate by means of the Reformatsky reaction to obtain ethyl beta-phenyl-beta-hydroxybutyrate. When the latter is treated with the organomagnesium compound by a procedure identical to that of Example I, it gives in a yield of 70% of the product having a M.P. of 71° C.

EXAMPLE 3

1-p-bromophenyl-1,3,3-trimethyl-propanediol

By the same series of operations, set forth in Example 1, starting with p-bromacetophenone and ethyl bromacetate, there is obtained in a yield of 75% of the product having a M.P.=104° C., bromine content: found 29.20%, calculated 29.30%.

In the following Examples IV and V, asymmetric compounds of Formula III are described:

EXAMPLE 4

1-p-bromophenyl-1-methyl-3,3-diethyl-1,3-propanediol

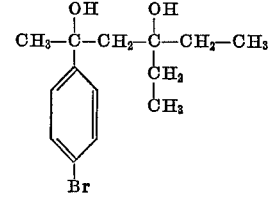

is prepared, using as starting material ethyl beta-p-bromophenyl-beta-hydroxy-butyrate of the formula:

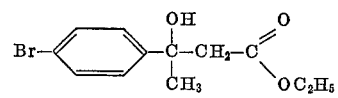

prepared by the Reformatsky condensation of ethyl bromacetate with p-bromacetophenone.

The reaction is carried out under dry nitrogen in a spherical flask into which 40 g. of magnesium chips and a trace of iodine have been introduced.

The product is covered with 200 cc. of anhydrous ether, and a few cc. of a solution of 76 cc. of ethyl bromide in 200 cc. of anhydrous ether is added. The reaction is started by gentle heating, whereafter the remainder of the ethyl bromide solution is added. At the end of the reaction, there is obtained a clear solution, which is made up to 500 cc.

The condensation is thereafter carried out in a second spherical flask containing 2/10 mol. of hydroxy ester (57 g.) and 300 cc. of anhydrous ether.

The product is cooled and the previously prepared magnesium solution is added with good stirring.

The succession of manipulations is the same as in Example I.

Finally, white microcrystals are obtained.

Analysis gives the empirical formula $C_{14}H_{21}O_2Br$ (mol. weight 301); Br: calculated (percent)=26.58; found (percent)=26.35. Melting point: 73° C.

EXAMPLE 5

1-phenyl-1-ethyl-3,3-dimethyl-1,3-propanediol

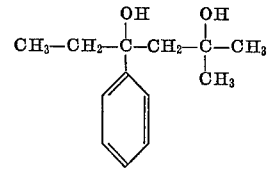

is prepared, using as starting material ethyl beta-phenyl-beta-hydroxypentanoate of the formula:

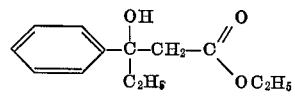

prepared by the Reformatsky condensation of ethyl bromacetate with propionphenone.

The reaction is carried out under dry nitrogen in a spherical flask into which 40 g. of magnesium chips and a trace of iodine have been introduced.

The product is covered with 200 cc. of anhydrous ether, and a few cc. of a solution of 50 cc. of methyl iodide in 200 cc. of anhydrous ether is added.

The reaction is started by gentle heating, whereafter the remainder of the methyl iodide solution is added.

At the end of the reaction, a clear solution is obtained, which is made up to 500 cc.

The condensation is thereafter carried out in a second spherical flask containing 2/10 mol. of hydroxy ester (44 g.) and 300 cc. of anhydrous ether.

The product is cooled and the previously prepared magnesium compound solution is added with good stirring.

The sequence of the manipulations is the same as in Example I.

Analysis of the compound gave the empirical formula $C_{13}H_{20}O_2$ (mol weight: 208): Found (percent): C, 75.10; H, 9.35. Calculated (percent): C, 75.00; H, 9.62.

The product melts at 43° C.

Operating as in the preceding examples, other compounds in accordance with the invention have been prepared. (Examples 6 to 18 in Table I below). They are identified in Table I by the type of radical, $R_1$, $R_2$ and Ar of Formula I and by their melting point. In the Table I are also indicated the ketone from which the starting hydroxyester was obtained by the Reformatzky reaction, and the organomagnesium compound used.

Following results have been obtained by carrying out toxicity tests:

| Compound of Example— | $DL_{50}$ in mg./kg. |
|---|---|
| 4 | 1575 |
| 5 | 1080 |
| 6 | 770 |
| 7 | 4100 |
| 12 | 1400 |
| 13 | 2225 |

The compounds of the invention may be employed in any conventional way in association with pharmaceutical carriers, in concentration, for example, between 0.1% and 95%.

What is claimed is:
1. A compound of the formula

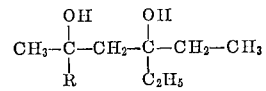

wherein R is p-chlorophenyl or p-fluorophenyl.

2. A compound according to claim 1 wherein R is p-chlorophenyl.

3. A compound according to claim 1 wherein R is p-fluorophenyl.

TABLE I

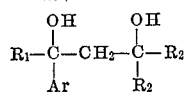

| Example No. | Ar | $R_1$ | $R_2$ | Melting point, °C. | Starting-ketone | $R_2MgX$ | Final substituted, 1,3-propane-diol |
|---|---|---|---|---|---|---|---|
| Symmetric: | | | | | Acetophenone: | | |
| 6 | p-Fluorophenyl | $CH_3$ | $CH_3$ | 48 | p-Fluoro | $CH_3IMg$ | 1-p-fluoro-1-methyl-3-3-dimethyl. |
| 7 | Phenyl | $C_2H_5$ | $C_2H_5$ | 89.5 | Propiophenone | $C_2H_5BrMg$ | 1-phenyl-1-ethyl-3-3-diethyl. |
| 8 | p-Fluorophenyl | $C_2H_5$ | $C_2H_5$ | 70 | p-Fluoro | $C_2H_5BrMg$ | 1-p-fluorophenyl. |
| 9 | p-Chlorophenyl | $C_2H_5$ | $C_2H_5$ | 84.0 | p-Chloro | $C_2H_5BrMg$ | 1-p-chlorophenyl. |
| 10 | p-Bromo-phenyl | $C_2H_5$ | $C_2H_5$ | | a-Bromo | $C_2H_5BrMg$ | 1-p-bromo-phenyl. |
| Asymmetric: | | | | | | | |
| 11 | Phenyl | $CH_3$ | $C_2H_5$ | 55 | Acetophenone | $C_2H_5BrMg$ | 1-phenyl-1-methyl-3,3-diethyl. |
| 12 | p-Fluorophenyl | $CH_3$ | $C_2H_5$ | 50 | p-Fluoro | $C_2H_5BrMg$ | 1-p-fluorophenyl. |
| 13 | a-Chlorophenyl | $CH_3$ | $C_2H_5$ | 82 | p-Chloro | $C_2H_5BrMg$ | 1-p-chlorophenyl. |
| 14 | p-Fluorophenyl | $C_2H_5$ | $CH_3$ | 75 | p-Fluoro-propiophenone | $CH_3IMg$ | 1-p-fluorophenyl-1-ethyl-3,3-dimethyl. |
| 15 | p-Chlorophenyl | $C_2H_5$ | $CH_3$ | 84 | a-Chloro | $CH_3IMg$ | 1-p-chlorophenyl. |
| 16 | p-Bromo-phenyl | $C_2H_5$ | $CH_3$ | 72 | p-Bromo | $CH_3IMg$ | 1-p-aromo-phenyl. |
| 17 | Phenyl | $C_3H_7$ | $CH_3$ | 42 | Butyrophenone | $CH_3IMg$ | 1-phenyl-1-n-propyl-3,3-dimethyl. |
| 18 | do | $C_3H_7$ | $C_2H_5$ | 52 | do | $C_2H_5BrMg$ | 1-phenyl-1-n-propyl-3,3-diethyl. |

As indicated above, the new asymmetric tertiary beta-diols of Formula III, according to the invention have distinct pharmacological properties from those of the symmetric tertiary beta-diols of Formula II.

If in the p-chlorophenyl series the symmetric trimethyl compound of Example 1 above is compared to the asymmetric methyl diethyl compound of Example 13, it is observed that the latter compound induces a barbitural sleep potentialization two times greater that the first compound. On the other hand, the "asymmetric" ethyl compound presents increased depressive effects while maintaining the same anticonvulsive effects as the first compound. The test results are summarized in Table II below:

TABLE II

| Pharmacological tested action | Compound of— | |
|---|---|---|
| | Example 1 | Example 13 |
| Action of the behavior | Increase of activity. Little depressive indications. | Increase of activity. Presence of depressive indications. |
| Action on the traction test. | + | +++ |
| Sleep potentialization | x 3,5 | x 6. |
| Anti-convulsive action against pentetrazole. | +++ | ++ |
| Anti-convulsive action against strychnine. | + | ++ |

References Cited

FOREIGN PATENTS 1,248,420  11/1960  France _____ 260—618 D
1,324,391  3/1963  France _____ 260—618

OTHER REFERENCES

Morrison et al., Organic Chemistry (1959), 485, 491–492.

BERNARD HELFIN, Primary Examiner

U.S. Cl. X.R.

260—491, 999; 424—343